UNITED STATES PATENT OFFICE.

EUDO MONTI, OF TURIN, ITALY.

ART OF CONCENTRATING GRAPE-JUICE.

1,379,470.   Specification of Letters Patent.   Patented May 24, 1921.

No Drawing.   Application filed March 28, 1919.   Serial No. 285,905.

*To all whom it may concern:*

Be it known that I, EUDO MONTI, doctor of chemistry, subject of the King of Italy, residing at 20, via Figlie dei Militari, Turin, Italy, have invented certain new and useful Improvements in the Art of Concentrating Grape-Juice, of which the following is a specification.

The present invention relates to certain new and useful improvements in the art of concentrating grape juice.

Grape juice is generally sold in bottles, sterilized at a temperature from 80 to 85° C. At this temperature the albuminous matter contained in the juice curdles and separates or remains in suspension, thus giving a turbid appearance to the juice. Therefore many manufacturers boil the juice and filter it before bottling, but this eliminates all the elements to which grape juice owes its dietetic and therapeutical properties. Also bottles now generally cost and weigh more than the juice they contain. The object of the present invention is to avoid the loss of useful constituents of the juice and the necessity of sterilizing it; and to prevent alteration of the enzyms, salts, acids, lecithanes, hormones and vitamins contained in natural grape juice.

I first freeze the juice at a suitable temperature by means of a revolving freezer or other suitable apparatus. I then separate the concentrated juice from the ice crystals, either by systematically exhausting them with the more and more diluted juice derived from the fractionated liquefaction of the frozen mass in a previous operation, or by means of a centrifugal machine.

However, even by very hard freezing and separating the juice by means of a centrifugal machine it is rather difficult and costly to obtain grape juice containing more than 25% by weight of dry extract.

Juice prepared in this way is excellent as regards taste, and improves very much if stored in a cold place. It will keep if sterilized in bottles at a temperature of about 50° C. but will not keep if transported during the hot season in barrels or demijohns. To make the juice keep during the warm season without sterilizing, I must reconcentrate it to a specific weight of about 1350 grams per liter, that is, to a concentration of from 70 to 75% weight of dry extract. But although the concentration of the juice in one of my patented lukewarm water concentrators will not alter its taste, most of the flavor will evaporate. I meet this difficulty and obtain a richly flavored product tasting exactly like the fresh juice by first concentrating all the juice by freezing, then filtering it and putting it away in a cold place, and, after an interval, separating it in two almost equal parts, one of which I evaporate in one of my patented lukewarm water vacuum concentrators at a temperature not exceeding 40° C. to a specific weight of about 1350 to 1380 grams per liter, or about 85 grams of dry extract in 100 gr. of product.

I then mix the two products in such proportions as to obtain a syrup containing about 60% in weight dry extract, cool the mixture and saturate it with air at a low temperature or filter it in a refrigerated room on contact with the air and keep it for some time in cold storage at a temperature below the freezing point of water till it becomes perfectly clear. The product thus oxidized and hydrolyzed by the action of the enzyms which have not been altered during the concentration will soon acquire a flavor as delicate and as strong as the natural grape juice concentrated by freezing. It can then be poured into bottles and mechanically corked or into barrels coated with paraffin. Beer barrels previously washed with lukewarm water to which has been added about 1% carbonate of soda will do very well. The barrels must of course be hermetically sealed, and it is advantageous to fill them with dry carbonic acid before pouring in the concentrated grape juice. Experience has taught me that the juice thus concentrated and shipped will not alter even in hot climates, and that diluting it with four to five times its weight of natural, distilled, or soda water, I obtain a drink which looks and tastes exactly like fresh grape juice, and which has all the refreshing, invigorating and digestion-helping properties of fresh grape juice.

By further concentrating the juice in a lukewarm water concentrator to a specific weight of about 1400 grams per liter and containing from 88 to 90% dry extract, and mixing said syrup with about one-fourth of its weight of scented grape juice prepared as above set forth, I obtain a mixture containing from 75 to 80% dry extract, according to the kind of the grapes and their acidity. If this mixture is then left in a cool but not very cold place from 8 to 15° C., and preferably in glass jars exposed to light, a solid mass will crystallize out, having the consistency of bee honey and the flavor of scented grape juice; and which will look like honey if prepared from white grapes, such as favorita, muscadine, alicante and the like.

In the following claims I have used the word "set" with reference to one of the steps of my process. It is to be understood, however, that I may filter the juice in partial or complete substitution for the setting operation.

Having thus described the nature of my invention, what I claim is:

1. The process of treating grape juice, which comprises concentrating a quantity of juice to a specific weight of the order of 1380 grams per liter at a temperature not exceeding 40° C., concentrating another quantity of juice to a specific weight of the order of 1200 grams per liter by freezing it in contact with air, keeping said last-mentioned quantity of juice subjected to a cold temperature and in contact with air until set, and then mixing together the two quantities of juice and allowing the mixture to set.

2. In the process set forth in claim 1, proportioning the two quantities of juice so that the mixture will contain a little more than 60% of dry extract by weight.

3. The process of treating grape juice which comprises concentrating the juice to a specific weight of the order of 1200 grams per liter by freezing it in contact with air, keeping the concentrated juice subjected to a cold temperature in contact with air until set, further concentrating a portion of the juice to a specific weight of the order of 1380 grams per liter and mixing together the two quantities of juice.

4. In the process set forth in claim 3, proportioning the two quantities of juice so that the mixture will contain a little more than 60% of dry extract by weight.

5. In the process set forth in claim 1, the step which consists in cooling the mixture of juices to a temperature a little above its freezing point and maintaining it at a low temperature until set and aged.

6. In the process set forth in claim 3, the step which consists in cooling the mixture of juices to a temperature a little above its freezing point and maintaining it at a low temperature until set and aged.

7. The process of treating grape juice, which comprises concentrating the juice to a specific weight of the order of 1200 grams per liter by freezing it in contact with air, keeping the juice subjected to a cold temperature and in contact with air until set, further concentrating a portion of the juice to a density of the order of 90% dry extract at a temperature not exceeding 40° C., mixing the remainder of the juice first mentioned with the syrup formed by the last-mentioned step of the process so as to produce a mixture comprising 75 to 80% of dry extract, and permitting the mixture to crystallize out in a product having the consistency of honey and the flavor of grape juice.

In testimony whereof the foregoing specification is signed in the presence of two witnesses.

EUDO MONTI.

Witnesses:
FRANCISCO LATUTY,
GIUSEPPI DE LEO.